Figure 1:
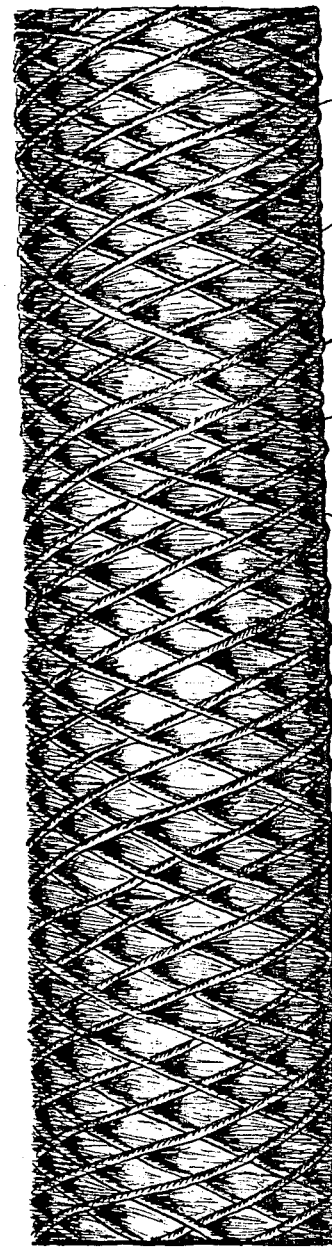

INVENTOR.
EDWARD R. ADAMS

United States Patent Office

3,398,837
Patented Aug. 27, 1968

3,398,837
IMPREGNATED SELF-SUPPORTING HONEY-
COMBED FILTER CARTRIDGE
Edward R. Adams, Lebanon, Ind., assignor to Commercial
Filters Corporation, Lebanon, Ind., a corporation of
New York
Filed Dec. 3, 1964, Ser. No. 415,647
3 Claims. (Cl. 210—496)

This invention relates to improvements is an impregnated filter cartridges or tube comprising a fibrous yarn or roving wound into tubular form, the element being highly desirable for the filtering of substantially any liquid ranging from low viscosity to fairly high viscosity liquids, although in some instances it might also be used for the filtration of gases, as will be apparent to one skilled in the art.

In general, the instant filter tube is formed of a fibrous yarn or roving wound into tubular form so as to define a number of diamond-shaped honeycomb overlapping patterns which form inwardly narrowing passages from the outside of the tube to the inside thereof, the yarn being napped so as to provide a myriad of fibers extending across each of the passages. The entire filter tube is impregnated throughout with a synthetic resin, other thermosetting plastic material, or any other material which will give the necessary rigidity and strength to the element.

In the past, such filter tubes, without any impregnation, have been used extensively for the filtering of various liquids, including beverages, oils, chemicals, and the like. Those filters were usually formed of cotton yarn, napped to provide fibers extending across the passages or channels therein. Each filter tube so made in the past, however, required the use of a relatively stiff perforated core tube inside the wound yarn to provide the necessary strength and resistance against collapse due to pressure differential between the entering contaminated fluid and the filtrate discharged. The use of such core tubes added greatly to the cost of manufacture, and particularly so because it was impossible to standardize a core tube but quite a large variety of tubes of different materials must be maintained on hand to provide center tubes that will be inert to chemicals, and center tubes to which beverages and the like will be inert, the materials varying in accordance with the particular fluid to be filtered. Such formerly known filtering units also were subject to the disadvantage of compressing during filtration of viscous fluids owing to the added pressure necessary to force such fluids through the filter tube, whereby the contaminant holding capacity of the filter tube was reduced.

With the foregoing in mind, it is an important object of the instant invention to provide a filter tube wound in honeycomb fashion from a fibrous yarn or roving, which filter tube is impregnated throughout with a stiffening and strengthening agent.

The instant invention accordingly provides many distinct advantages over the aforesaid honeycomb filter made heretofore, among which are the following:

(a) Impregnated filter tube has a greater dirt holding capacity in connection with viscous fluid filtration, because the filter element itself is sufficiently strong to resist compression that would reduce the void volume of the element.

(b) The impregnated element also has greater capacity on low viscosity fluids due to its strength sufficient to resist compression caused by increase in pressure differential, brought about by plugging of the filter element with the contaminants.

(c) The impregnated filter tube has sufficient strength and stability to obviate the necessity for the center or core tube, which may be entirely eliminated, a highly significant economic advance in the manufacture of the invention.

(d) The tube of this invention can be used under higher pressure differentials than was possible heretofore with the honeycomb filter, and so is suitable for many more filtration applications.

(e) With the instant invention the individual fibers in the filter element extending across the channels or passages of the element as well as the strand of yarn or roving itself are held in position against migration during the filtration cycle, even with a high pressure differential.

(f) The instant invention is also more effective in repelling entrained water or oil in a gas stream, because the filter element is non-absorbent and hydrophobic.

(g) The instant invention is also better able to resist the unloading of contaminants often associated with an alternating on-off filtration operation such as frequently occurs in the filtering of engine oil.

Figure 2:
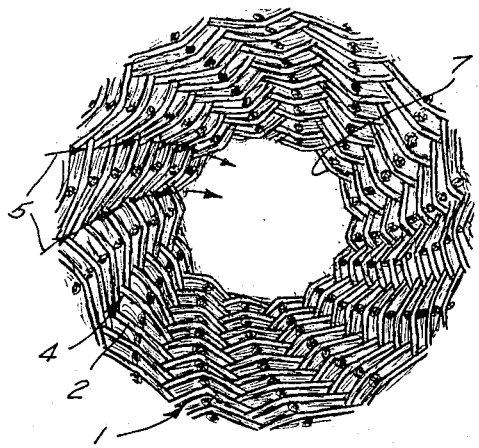
Figure 3:
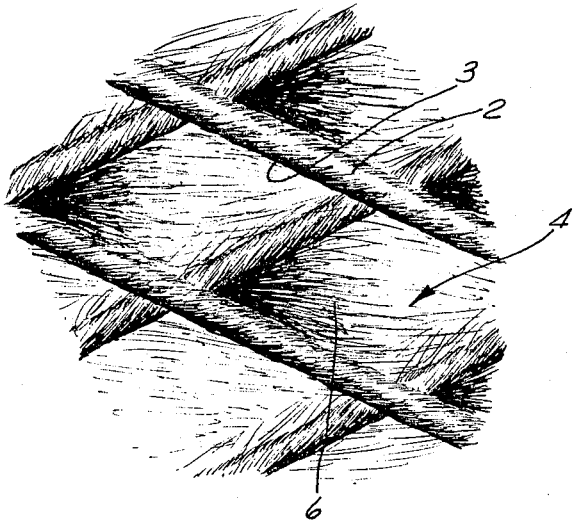

While some of the more salient features, characteristics and advantages of the instant invention have been above pointed out, others will become apparent from the following disclosures taken in conjunction with the accompanying drawing, in which, FIGURE 1 is a side elevational view of a filter element embodying principles of the instant invention;

FIGURE 2 is an enlarged transverse plan sectional view of the structure of FIGURE 1; and FIGURE 3 is a fragmentary highly magnified view of the surface of the filter tube.

As shown on the drawings:

The illustrated embodiment of the instant invention may be made in general by the method more fully set forth and described in Maurice A. Goldman U.S. Letters Patent No. 1,958,268 issued May 8, 1934, with the exception that the present invention does not embody any permanent core tube.

The illustrated embodiment of the invention is a filter tube, generally indicated by numeral 1, and is made up of a yarn 2 which can be a loosely spun fuzzy yarn of cotton fibers, viscose rayon, cellulose acetate, or other synthetic fibers. The yarn used may be satisfactorily from 3/32 inch, 1/8 inch, or slightly larger in diameter, depending upon the character and use intended for the ultimate filter tube, and the yarn resembles a rove.

The yarn is wound around a temporary mandrel, which is removed after impregnation of the filter tube. The winding is in successive layers, and the yarn is wound in helical convolutions spaced along the mandrel in one direction, and then in the opposite direction in crisscrossed manner. This provides rhombic or diamond-shaped openings 3 between successive layers, as seen in FIGURES 1 and 3. During the winding the strands of subsequent layers should be placed uniformly over the strands of previous layers, but the crossing points of the strands are preferably moved slightly as to circumferential position as the tubular element is built up, thus causing the spaces 3 in a sucessive layer to form curvate tunnels or passages, generally indicated by numeral 4 in FIGURE 2, through which most of the fluid being filtered will flow in the direction of the arrows 5 in FIGURE 2.

In a filter tube approximating ten inches in length, two and one-half inches in diameter with a one inch central opening therethrough, there may be 300 or more such channels or passages 4. The passages extend from the outside of the unit to the inside thereof. While the yarn is being wound, it is also napped to provide numerous fibers extending therefrom across all the rhombic openings in the layers and accordingly a myriad of times across each passage 4, these fibers being indicated at 6 in FIGURES 1 and 3.

The entire filter tube is impregnated throughout with a bonding agent, such as a suitable thermosetting resin. Many examples of suitable bonding agents are known to those skilled in the art, among which, by way of example and not by way of limitation, are phenol-formaldehyde resins, urea-formaldehyde resins, melamine resins, and other materials having the characteristics of thermosetting plastics. In some instances thermoplastic materials may be utilized, but thermosetting materials are preferred because of their resistance to high temperatures. Obviously, the material selected as a bonding agent must be insoluble and inert to the fluid being filtered.

After the bonding agent has been set and cured, the yarn and the napped fibers 6 thereof will be held in position against migration during the filtration cycle, and the filter tube has sufficient strength to resist compression or collapsing under high pressure differential, and the element is capable of resisting compression even though liquid of relatively high viscosity is being filtered. Thus, the finished filter tube is capable of performing the results and advantages above listed.

The discovery that it is possible to eliminate the use of any form of center or core tube in the opening 7 through the filter tube is an important economical advantage and advance in the art of producing the filter tubes.

The amount of impregnation of the filter tubes can be in the neighborhood of 30 to 40% of the weight of the wound fiber itself. Further, it will be understood that the bonding agent is applied in such a manner as not to adversely affect the void volume of the filter tube.

In addition it will be noted that the size and shape of the passages 4, number of layers of yarn, thickness of yarn, amount of fibers extending across the passages 4, and the overall size of the filter tube itself, may all be varied within wide limits according to the flow capacity desired, the density required to adequately filter particular fluids, and the pressure used for the various fluids being filtered. By way of example, for filtration of fuel oil and similar substances, ⅛ inch wide passages 4, covered by napped fibers 6 should be satisfactory.

The filter tube of the instant invention is not only economical to manufacture, but provides a considerably greater field usage than similar elements named heretofore, and the unit is further simple to install in a filter casing, highly durable, and highly efficient in operation.

It will be understood that modifications and variations may be effected without departing from the spirit and scope of the novel concepts of the present invention.

I claim as my invention:

1. A mechanically self-sustaining porous tubular filter element having:
   napped yarn wound back and forth in spaced criss-cross fashion into a honeycomb tube and providing a tunneled wall of substantial thickness about an unrestricted axial bore;
   and a cured thermosetting bonding agent impregnating and bonding the windings of said yarn together into a substantially rigid unit without interfering with the porosity of the tube, the tube withstanding radially compressive forces under high pressure differential substantially without compressing of the yarn windings or the tube wall even though there is no supporting core means in said bore.

2. A filter element as defined in claim 1, in which said cured bonding agent comprises a thermosetting bonding resin selected from the group consisting of phenol-formaldehyde resins, urea-formaldehyde resins and melamine resins.

3. A mechanically self-sustaining porous tubular filter element having:
   napped yarn wound back and forth in spaced criss-cross fashion into a honeycomb tube and providing a tunneled wall of substantial thickness about an unrestricted axial bore;
   napped fibers of the yarn extending across the tunnels;
   and a cured thermosetitng bonding agent impregnating and bonding the yarn windings together into a substantially rigid unit and holding said napped fibers against migration and without interfering with the porosity of the tube, said tube withstanding radially inward compressive forces under high pressure differential substantially without compression of the yarn windings or the tube wall even though there is no supporting core means in said bore.

References Cited
UNITED STATES PATENTS

| | | | |
|---|---|---|---|
| 1,958,268 | 5/1934 | Goldman | 210—508 X |
| 2,607,494 | 8/1952 | Valente et al. | 210—508 X |
| 2,843,153 | 7/1958 | Young | 156—175 X |
| 3,080,268 | 3/1963 | Bjork | 156—173 X |
| 3,105,786 | 10/1963 | Anderson | 156—173 |

OTHER REFERENCES

American Viscose Corporation, Fiber Facts, 1963–64, p. 67 (copy in group 165).

LEON D. ROSDOL, *Primary Examiner.*

I. GLUCK, *Assistant Examiner.*